United States Patent [19]

Taillie et al.

[11] Patent Number: 5,875,365

[45] Date of Patent: Feb. 23, 1999

[54] PHOTOGRAPHIC CAMERA WITH MECHANICALLY ACTUATED TENSION CONTROL FOR REDUCING VARIATION OF SPEED OF FILMSTRIP DURING REWIND

[75] Inventors: Paul L. Taillie, Rochester; Thomas J. Quattrini, Byron; Robert L. Kuhn, Jr., Rush; Robert D. Huot, Pittsford, all of N.Y.

[73] Assignee: Eastman Kodak Company, Rochester, N.Y.

[21] Appl. No.: 802,740

[22] Filed: Feb. 20, 1997

[51] Int. Cl.⁶ .................................................... G03B 1/00
[52] U.S. Cl. ........................ 396/395; 396/411; 396/418; 396/413
[58] Field of Search .................................. 396/387, 395, 396/411, 418, 440, 514, 319

[56] References Cited

U.S. PATENT DOCUMENTS

| | | | |
|---|---|---|---|
| 4,589,604 | 5/1986 | Yagi et al. | 396/411 |
| 4,974,787 | 12/1990 | Arai et al. | 396/387 |
| 5,021,820 | 6/1991 | Robison et al. | 355/40 |
| 5,130,745 | 7/1992 | Cloutier et al. | 355/40 |
| 5,287,136 | 2/1994 | Kitagawa et al. | 354/173.1 |
| 5,398,089 | 3/1995 | Stiehler | 396/418 |
| 5,450,149 | 9/1995 | Cocca | 354/106 |
| 5,549,540 | 8/1996 | Wakabayashi et al. | 354/105 |
| 5,568,214 | 10/1996 | Stiehler | 396/411 |
| 5,640,637 | 6/1997 | Stephenson, III | 396/411 |
| 5,655,169 | 8/1997 | Newman | 396/395 |

FOREIGN PATENT DOCUMENTS

8136996-A 5/1996 Japan.
8152670-A 6/1996 Japan.

Primary Examiner—Eddie C. Lee
Attorney, Agent, or Firm—Charles E. Snee, III; Gordon M. Stewart

[57] ABSTRACT

A photographic camera (10) includes a supply chamber (14) for receiving a cartridge (16) enclosing a photographic filmstrip (18) wound on a supply spool (92); a rotatable member (90) disposed in the supply chamber for being coupled to rotate a supply spool of a cartridge installed in the supply chamber; a takeup chamber (20); a takeup spool (22) in the takeup chamber for winding a filmstrip drawn in a first direction from a cartridge in the supply chamber; a head (102) positioned between the supply and takeup chambers for at least one of reading and recording data on a filmstrip; a first drive system (24, 50–78) for rotating the takeup spool to draw a filmstrip from a cartridge in the first direction and wind a filmstrip onto the takeup spool; a second drive system (24, 50–68, 80–88) for rotating the rotatable member to rotate a supply spool to draw a filmstrip in a second, opposite direction from the takeup spool and wind a filmstrip onto a supply spool in a cartridge; and a brake mechanism (118, 118a, 118b, 118c), responsive to a change in rotation of the takeup spool from the first direction to the second direction, to resist rotation of the takeup spool in the second direction, so as to apply tension to a filmstrip to reduce variations in the speed of a filmstrip while the head records data as a filmstrip is wound from the takeup spool to a supply spool in a cartridge.

23 Claims, 7 Drawing Sheets

PHOTOGRAPHIC CAMERA WITH MECHANICALLY ACTUATED TENSION CONTROL FOR REDUCING VARIATION OF SPEED OF FILMSTRIP DURING REWIND

DESCRIPTION

1. Technical Field

The invention concerns photographic cameras of a type having features for reading or recording data on a filmstrip. More particularly, a camera according to the invention is adapted to magnetically record on the filmstrip during rewinding into a cartridge and includes a brake or slip-clutch mechanism for controlling tension in the filmstrip to reduce variations in the speed of the filmstrip during magnetic recording.

2. Background of the Invention

In recent years photographic cameras have been described in publications and introduced commercially, which use filmstrips having a magnetic back layer to enable a magnetic head in the camera to read or record data on the filmstrip. Commonly assigned U.S. Pat. Nos. 5,021,820 and 5,130,745 disclose examples of how such a magnetic head can be used.

Typically in such cameras, data is recorded on the filmstrip after each exposure as the filmstrip is moved in a first, takeup direction. However, U.S. Pat. No. 5,287,136 discloses a camera in which data also may be recorded in a second, rewind direction. A complex, solenoid actuated brake and clutch system is provided to maintain tension in the filmstrip. U.S. Pat. No. 5,459,540 discloses a prewind camera in which data is recorded on a filmstrip after each exposure during rewind. Commonly assigned U.S. Pat. No. 5,450,149 discloses a technique for recording on a filmstrip in the rewind direction; however, jitter in the film transport speed during rewind is said to require multiple recordings of only low density data.

A need has existed for a much simpler, mechanically actuated tension control system for minimizing the effects of jitter to permit reliable recording of low or high density data in the rewind direction.

SUMMARY OF THE INVENTION

The primary objective of the invention is to provide a simple, reliable technique for controlling tension in a filmstrip during rewind, to minimize jitter and thereby facilitate reading or recording of magnetic data on the filmstrip.

Another objective of the invention is to provide an apparatus for controlling tension during rewind which is mechanically self-actuated in response to movement of the filmstrip in the rewind direction, but essentially is passive in the takeup direction.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

A photographic camera according to the invention includes a supply chamber for receiving a cartridge enclosing a photographic filmstrip wound on a supply spool; a rotatable member disposed in the supply chamber for being coupled to rotate a supply spool of a cartridge installed in the supply chamber; a takeup chamber; a takeup spool in the takeup chamber for winding a filmstrip drawn in a first direction from a cartridge in the supply chamber; and a head positioned between the supply and takeup chambers for at least one of reading and recording data on a filmstrip. The camera also includes a first drive system for rotating the takeup spool to draw a filmstrip from a cartridge in the first direction and wind a filmstrip onto the takeup spool; and a second drive system for rotating the rotatable member to rotate a supply spool to draw a filmstrip in a second, opposite direction from the takeup spool and wind a filmstrip onto a supply spool in a cartridge. Uniquely in accordance with the invention, the camera includes a brake mechanism, self-actuated in response to a change in rotation of the takeup spool from the first direction to the second direction, to resist rotation of the takeup spool in the second direction, so as to apply tension to a filmstrip to reduce variations in the speed of a filmstrip while data is recorded as a filmstrip is wound from the takeup spool to a supply spool in a cartridge.

A first embodiment of the brake mechanism includes a fixed member; and a helical clutch spring mounted about the fixed member, the clutch spring having a first, free end and a second end connected for rotation about the fixed member in response to rotation of the takeup spool. The clutch spring is mounted so that rotation of the takeup spool in the first direction is effective to loosen the clutch spring about the fixed member, while rotation of the takeup spool in the second direction is effective to tighten the clutch spring about the fixed member, whereby rotation of the takeup spool is resisted in the second direction.

A second embodiment of the brake mechanism includes a guide roller for engaging a filmstrip wound on the takeup spool; a spring member supporting the guide roller for rotation, the spring member being supported in the camera for resiliently engaging the guide roller with a filmstrip wound on the takeup spool; and a clutch or brake mechanism engaged with the guide roller for permitting free rotation of the guide roller when a filmstrip moves in the first direction and for resisting rotation of the guide roller when a filmstrip moves in the second direction.

A third embodiment of the brake mechanism includes a first gear rotated by the takeup spool when a filmstrip moves in the second direction; a second gear supported for rotation within the camera; a mechanism for resisting rotation of the second gear; and a mechanism for disengaging the first and second gears from a gear train when the takeup spool rotates in the first direction and for engaging the first and second gears in a gear train when the takeup spool rotates in the second direction. The mechanism for engaging and disengaging may include a swing gear mounted for movement by the first gear between a first position out of engagement with the second gear and a second position in engagement with both the first and second gears, whereby in the second position rotation of the first gear rotates the swing gear and the second gear.

A fourth embodiment of the brake mechanism includes a shaft driven by rotation of the takeup spool; and a helical spring clutch mounted about the shaft, the clutch spring having a first, free end and a second end connected to a frame of the camera. The clutch spring is mounted so that rotation of the takeup spool in the first direction is effective to loosen the clutch spring about the shaft, while rotation of the takeup spool in the second direction is effective to tighten the clutch spring about the shaft, whereby rotation of the takeup spool is resisted in the second direction.

A fifth embodiment of the brake mechanism includes a first gear rotated by the takeup spool when a filmstrip moves in the second direction; a second gear supported for rotation within the camera; a mechanism for resisting rotation of the second gear; and a mechanism for disengaging the first and second gears from a gear train when the takeup spool rotates in the first direction and for engaging the first and second gears in a gear train when the spool rotates in the second direction. The fifth embodiment further includes a guide roller for engaging a roll of filmstrip wound on the takeup spool; a spring member supporting the guide roller for rotation, the spring member being supported in the camera for resiliently engaging the guide roller with a roll of filmstrip wound on the takeup spool; and an extension of the spring member having a portion which engages and actuates the mechanism for resisting rotation when the takeup spool rotates in the second direction. The mechanism for disengaging and engaging may include a swing gear mounted for movement by the first gear between a first position out of engagement with the second gear when the takeup spool rotates in the first direction and a second position in engagement with both the first and second gears when the takeup spool rotates in the second direction, whereby in the second position rotation of the first gear rotates the swing gear and the second gear.

The invention provides various advantages. Since variations in speed of the filmstrip are reduced during rewind, data can be recorded more consistently and reliably on the filmstrip. This is achieved in a simple, mechanically self-actuated system which is passive in the takeup direction and requires no external actuator such as a solenoid. Since recording can be done during rewind, there is no need to record intermittently in the takeup direction or; alternatively, to rewind a fully exposed filmstrip, then do all recording in the takeup direction, and finally rewind again. Recording during rewind helps to minimize wear on the film, on the reading/recording head and on the film drive mechanism, saves battery life and minimizes wait time for the user.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
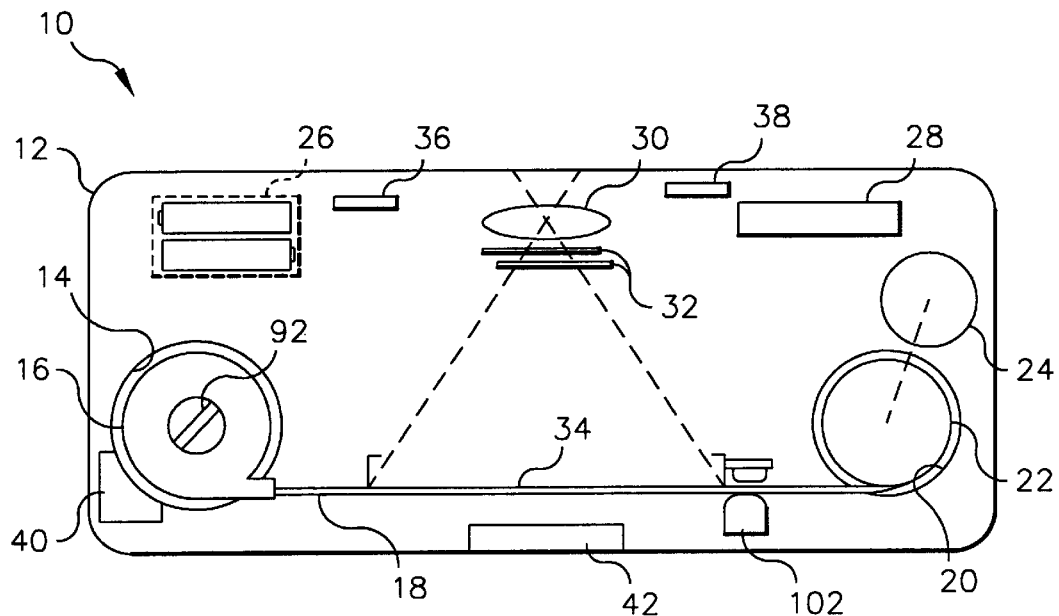
FIG. 1 shows a schematic view of internal components of a camera suitable for embodying the invention.

The following is a detailed description of the preferred embodiments of the invention, reference being made to the drawings in which the same reference numerals identify the same elements of structure in each of the several Figures.

Figure 2:
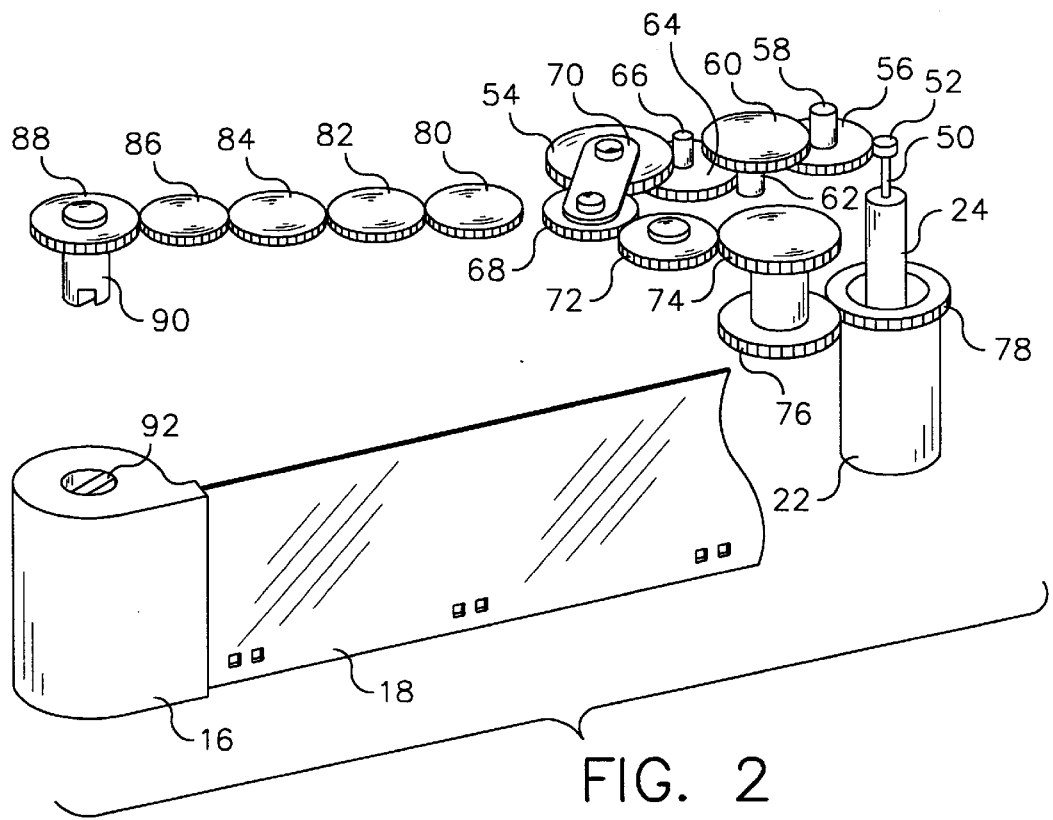
FIG. 2 shows an exploded, perspective view of a drive system for moving film in a first, takeup direction or a second, rewind direction in the camera of FIG. 1.
Figure 3:
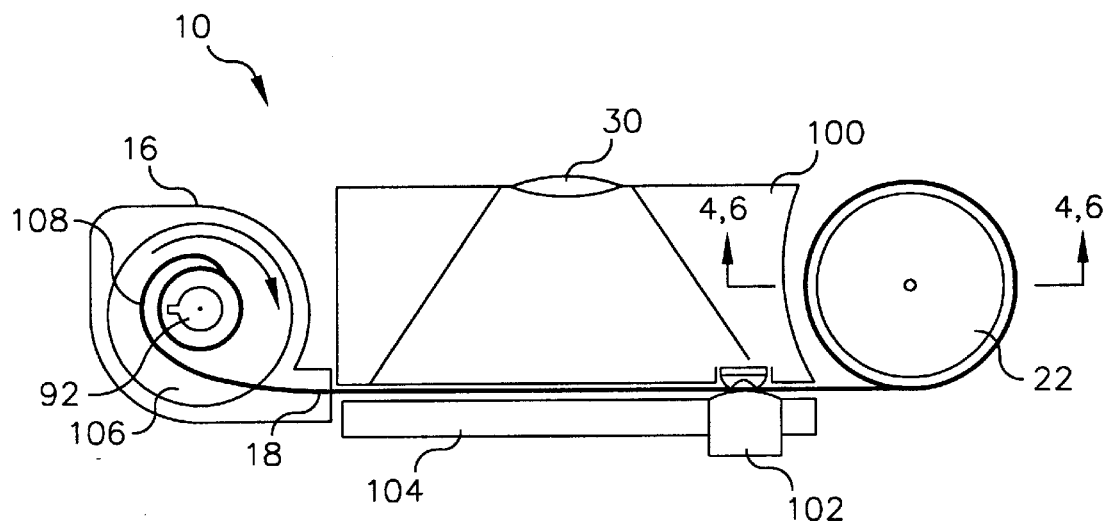
FIG. 3 shows a simplified view of the camera of FIG. 1, indicating how a film strip may form loose convolutions during rewinding into a cartridge.

FIGS. 1 to 3 show schematically a photographic camera 10 suitable for embodying the invention. A housing 12 encloses a supply chamber 14 in which a cartridge 16 may be placed to deliver a filmstrip 18 for exposure in the familiar manner. A takeup chamber 20 encloses a takeup spool 22 which is driven, via a gear train such as shown in FIG. 2, by a motor 24. Spool 22 may comprise a central core or arbor which may or may not have end flanges. A power source 26, such as a plurality of batteries, is enclosed by housing 12, along with a conventional electronic controller 28 for various camera features. A taking lens 30 focuses light from a scene to be photographed through a conventional combined shutter and aperture mechanism 32 onto an image plane 34. A conventional autoranging device 36 may be included for controlling focus, as well as a conventional light sensor for measuring light from the scene. A viewfinder 42 enables a user of the camera to compose a scene prior to exposure in the well known manner.

A drive system is included for moving filmstrip 18 in a first, takeup direction to spool 22 or a second, rewind direction back into cartridge 16. Motor 24 includes an output shaft 50 on which a drive pinion 52 is mounted. A sun gear 54 is driven by a reduction gear train comprising gears 56, 58, 60, 62, 64, and 66. Meshed with sun gear 54 is a planetary gear 68 rotatably mounted on a lever arm 70 which extends between the axles of gears 54, 68. When filmstrip 18 is to be driven in the takeup direction by driving spool 22, lever 70 is moved in a known manner by friction with gear 54 to the illustrated position. Gear 68 thus meshes with gear 72 of a takeup gear train comprising gears 72, 74, 76, and 78, the last gear being fixedly attached to takeup spool 22. Thus, a first drive system for moving the filmstrip in the takeup direction is formed by motor 24 and gear train 50–78. When filmstrip 18 is to be driven in the rewind direction, the direction of motor 24 is reversed and lever 70 is moved by friction so that gear 68 meshes with gear 80 of a rewind gear train comprising gears 80, 82, 84, 86, and 88. A rotatable fork 90 is mounted coaxially with gear 88 to engage a supply spool 92 within cartridge 16, only an end portion of spool 92 being visible in FIG. 2. Thus, a second drive system for moving the filmstrip in the rewind direction is formed by motor 24 and gear train 50–68, plus gear train 80–88.

In FIG. 3, an internal frame 100 of camera 10 is shown to support a magnetic read/record head 102 in position to contact the filmstrip at a location between supply chamber 14 and cartridge 16, and takeup chamber 22 and spool 20. Head 102 conveniently may be mounted on a backing plate 104 of the camera which helps flatten the filmstrip at image plane 34. As shown in FIG. 3, cartridge 16 may be of the known type in which spool 92 includes at its ends thrusting disks 106 which frictionally engage the edges of the filmstrip and, when spool 92 is rotated counter-clockwise as viewed in FIG. 3, are effective to thrust the filmstrip along image plane 34 until a leading end of the filmstrip is engaged by spool 22. Later, when all of the frames have been exposed, spool 92 is rotated in the opposite direction to rewind the filmstrip back into the cartridge. Because of the engagement of disks 106 with the edges of the filmstrip, during rewind the filmstrip may tend to form rather loose convolutions 108 on the spool which will periodically cinch more tightly about the spool. This behavior results in speed fluctuations or jitter of the filmstrip as it passes over head 102. This jitter results in unreliable reading or recording of information on the filmstrip in the rewind direction.

Figure 4:
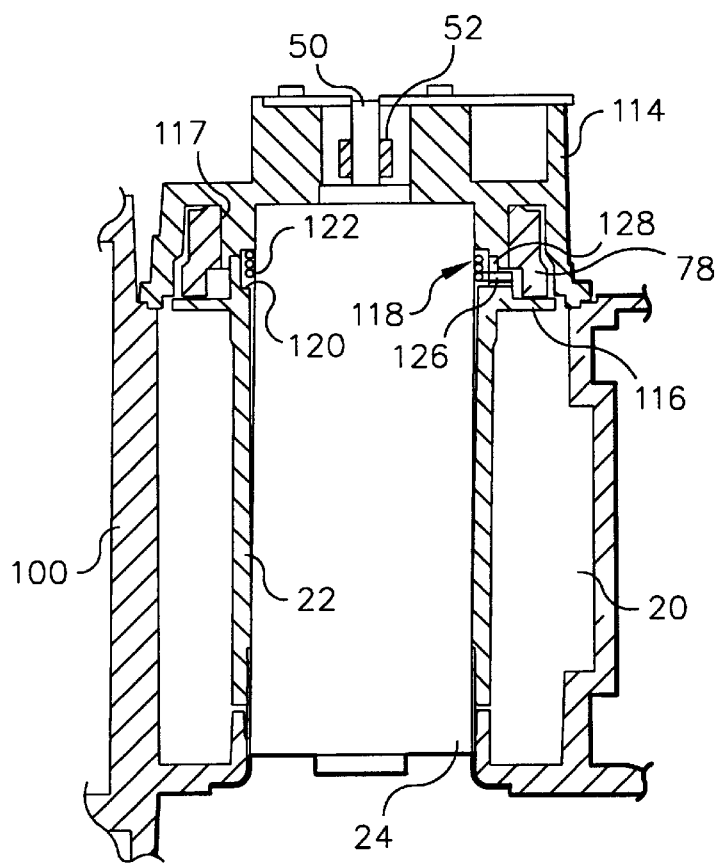
FIG. 4 shows a sectional view through a takeup chamber and spool of the general type shown in FIGS. 1 to 3, along line 4—4 of FIG. 3, indicating details of a first embodiment of a brake mechanism according to the invention.
Figure 5:
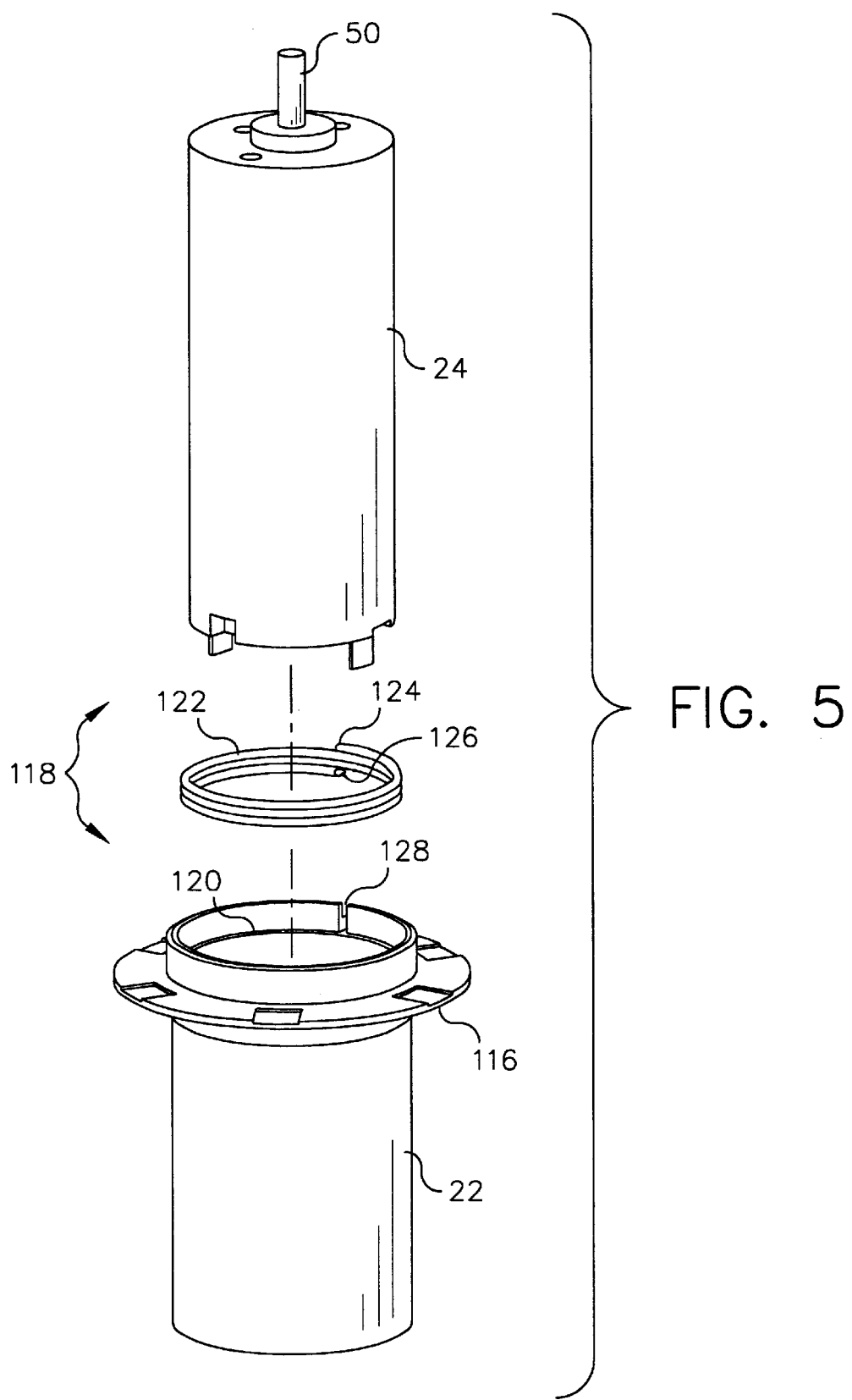
FIG. 5 shows an exploded view of the brake mechanism of FIG. 4.

FIG. 4 shows a sectional view of one embodiment of a brake mechanism according to the invention which ensures that enough tension is maintained in the filmstrip to minimize the effects of jitter. FIG. 5 shows an exploded view of the same mechanism. A mount 114 for motor 24 is supported on frame 100, so that the motor extends coaxially within spool 22, as also shown schematically in FIG. 2. Gear 78 is attached to a radially extended flange 116 on spool 22. A cylindrical surface 117 on support 114 serves as a plain bearing or rotational support for gear 78. A mechanical brake mechanism 118 is provided for resisting rotation of spool 22 in the rewind direction. As will be clear from the figures and the following description, each embodiment of the mechanical brake mechanism self-actuates mechanically, automatically when the direction of movement of filmstrip 18 changes from the takeup direction to the rewind direction, but essentially is passive during movement of the filmstrip in the takeup direction.

An internal relief 120 extends axially and circumferentially into an inside diameter of spool 22. Located in relief 120 is a helical clutch spring 122 having a relaxed internal diameter slightly smaller than the outer diameter of motor 24, to provide a slight interference fit. A first end 124 of the spring is free and a second end 126 is extended radially and captured within a radial slot 128 in spool 22. When spool 22 is rotated in the takeup direction, clutch spring 122 tends to open radially, thus loosening the clearance to motor 24, which acts as a fixed member within the clutch spring. Thus, the brake mechanism essentially is passive in the takeup direction. But, when spool 22 is rotated in the rewind direction, clutch spring 122 mechanically, automatically self-actuates and closes radially, thus tightening against motor 24 to resist rotation of the takeup spool. This results in application of tension to the filmstrip, which helps to minimize formation of loose convolutions 108 and thereby reduces variations in the speed of the filmstrip during rewind. Due to more uniform speed of the filmstrip, head 102 can read or record data more consistently and reliably on the filmstrip.

Figure 6:
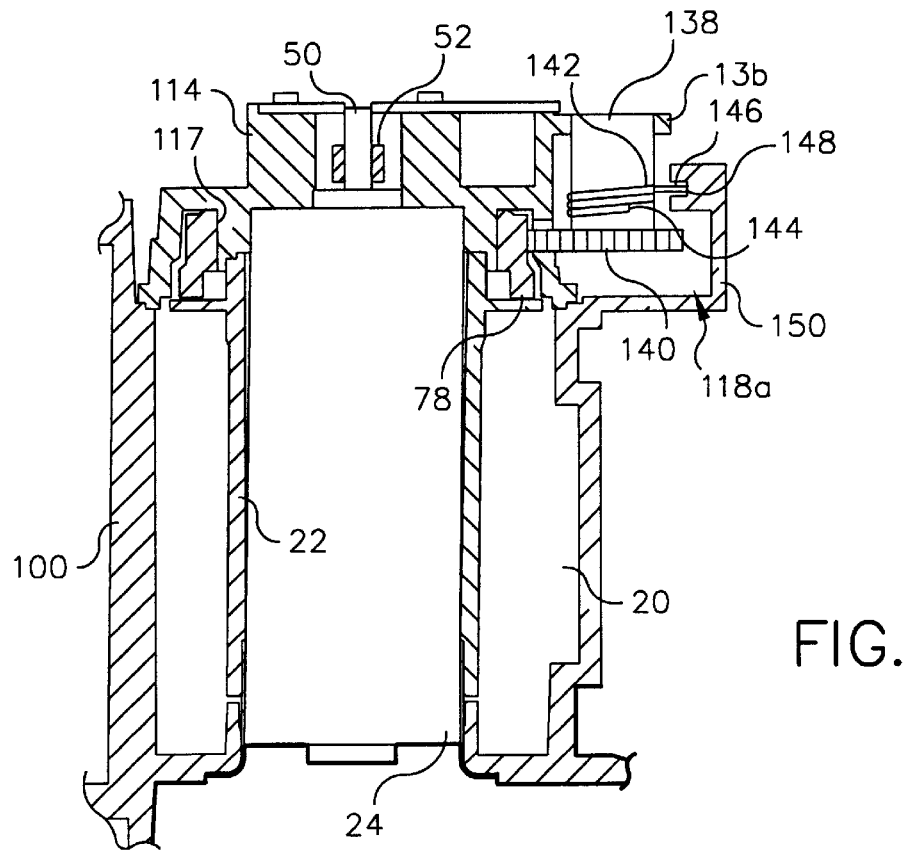
FIG. 6 shows a sectional view through a takeup chamber and spool of the general type shown in FIGS. 1 to 3, along line 6—6 of FIG. 3, indicating details of a second embodiment of a brake mechanism according to the invention.
Figure 7:
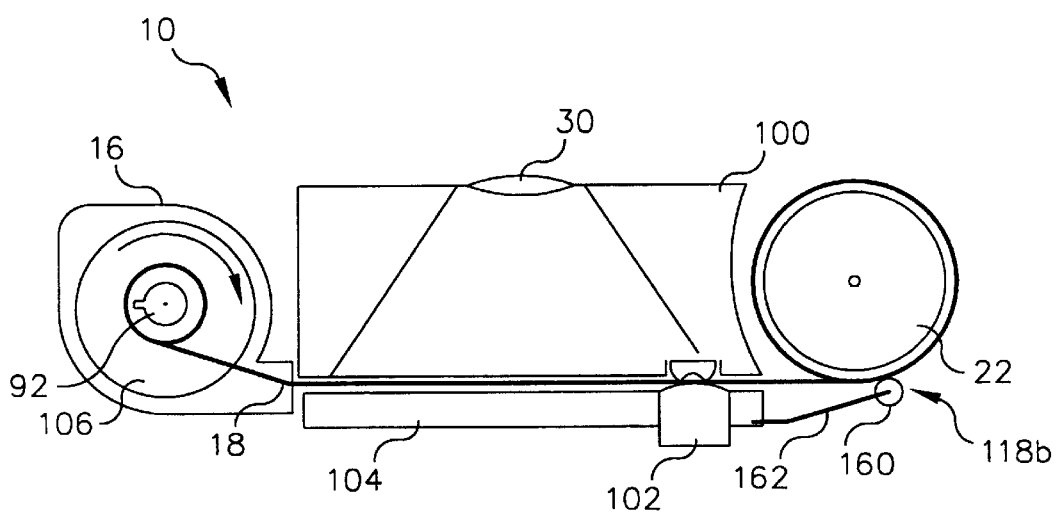
FIG. 7 shows a simplified view of the camera of FIG. 1, indicating details of a third embodiment of a brake mechanism according to the invention.
Figure 8:
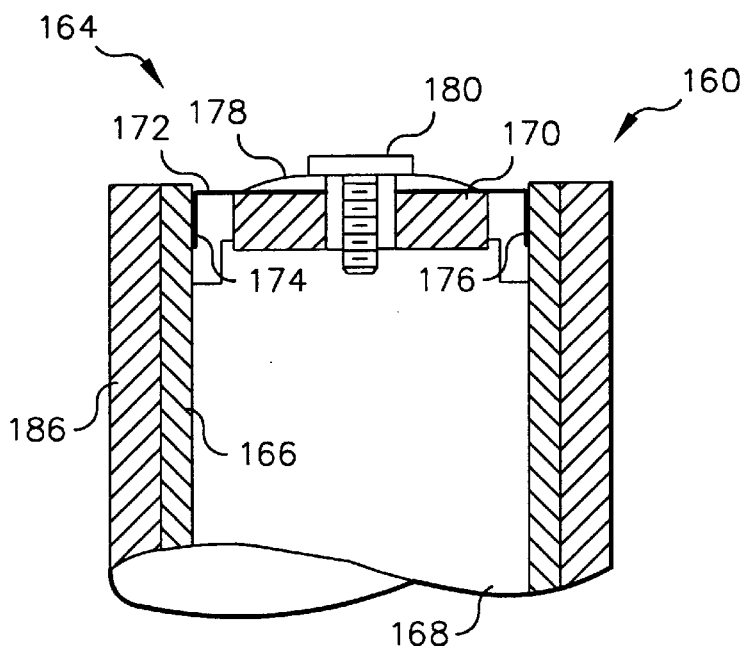
FIG. 8 shows a fragmentary sectional view through an end of roller 160 of FIG. 7.

FIG. 6 shows a sectional view of a second embodiment 118a of a mechanical brake mechanism according to the invention. In this instance a radially extended flange 136 on mount 114 rotatably supports a shaft 138 on which a gear 140 is mounted in position to mesh with gear 78. A helical clutch spring 142 surrounds shaft 138 and includes a first, free end 144 and a second, radially extended end 146 which is captured in a radial retainer slot 148 formed in an axially extended flange 150 on mount 114. Thus, when spool 22 is rotated in the takeup direction, shaft 138 is rotated due to the meshing of gears 78, 140. Clutch spring 142 is wound so that when the filmstrip is moving in the takeup direction, the spring tends to open radially, thus loosening the clearance to shaft 138. Thus, the brake mechanism essentially is passive in the takeup direction. But, when spool 22 is rotated in the rewind direction, clutch spring 142 mechanically, automatically self-actuates and closes radially, thus tightening against shaft 138 to resist rotation of the takeup spool. As with mechanism 118, this results in application of tension to the filmstrip, which helps to reduce variations in the speed of the filmstrip during rewind.

FIGS. 7 to 10 show views of a third embodiment 118b of a mechanical brake mechanism according to the invention. A guide roller 160 is supported for rotation at a free end of a cantilevered leaf spring member 162 which is fixed at one end to backing plate 104. Preferably, guide roller 160 has an axial length, not shown, chosen so that the guide roller can ride radially in and out between end flanges of spool 22, as the filmstrip is wound onto or unwound from the spool. Thus, spring member 162 is configured to press guide roller 160 against the filmstrip as it is wound and unwound. Roller 160 includes a clutch or brake mechanism 164, best seen in FIG. 8, which permits free rotation of the guide roller when filmstrip 18 is moving in the takeup direction but resists rotation of the guide roller when the filmstrip is moving in the rewind direction.

Roller 160 comprises a cylindrical roller body or shell 166 which is rotatably supported on an axle 168 attached to spring 162. An end of axle 168 supports an annular clutch disk 170. A pressure plate 172 engages clutch disk 170. Extended radially and circumferentially from pressure plate 172 are a pair of ratchet fingers 174, 176. A spring disk 178 engages pressure plate 172 and a screw 180 engages the spring disk. Thus, the degree of engagement between the pressure plate and the clutch disk can be varied by adjusting the compression of spring disk 178 using screw 180. On an inside surface of shell 166 are provided a pair of notches 182, 184.

Figure 9:
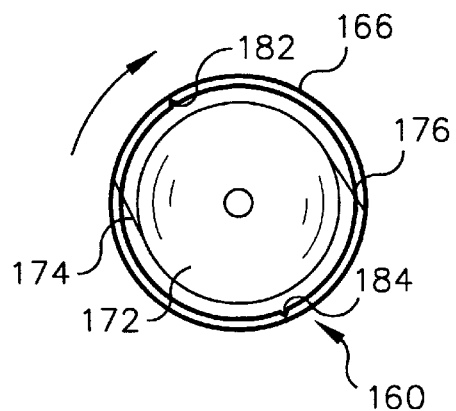
FIG. 9 shows a simplified end view of the roller of FIG. 8, indicating how the roller rotates freely in the first, takeup direction.
Figure 10:
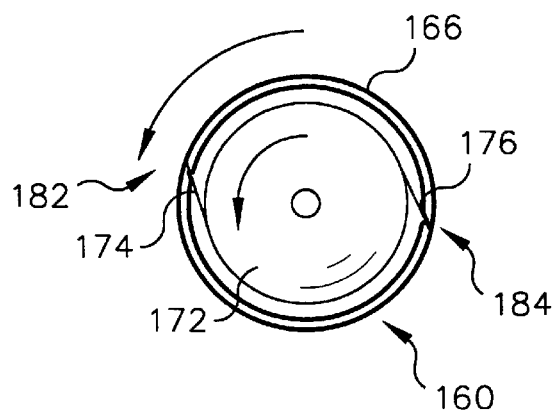
FIG. 10 shows a simplified end view of the roller of FIG. 8, indicating how the roller is braked in the second, rewind direction.

Due to the radial and circumferential orientation of ratchet fingers 174, 176, the ratchet fingers will slide past the notches when filmstrip 18 is moving in the takeup direction, thus causing roller 160 to rotate freely clockwise as shown in FIG. 9. But, when the filmstrip is moving in the rewind direction, the ratchet fingers will slip into the notches, thus tending to prevent roller 160 from rotating, as shown in FIG. 10. However, due to frictional engagement between roller 160 and the filmstrip, sufficient torque can be applied via the ratchet fingers to overcome friction between pressure plate 172 and clutch disk 170, thus allowing roller 160 to rotate against the resistance caused by slippage between the pressure plate and clutch disk. A compliant, high friction coating 186 of a material such as urethane or Neoprene may be provided on the outer surface of shell 166 to improve traction between roller 166 and the filmstrip. Thus, in the rewind direction, the brake/clutch mechanism of roller 166 provides resistance to rotation of spool 22, thereby resulting in the desired application of tension to the filmstrip.

Figure 11:
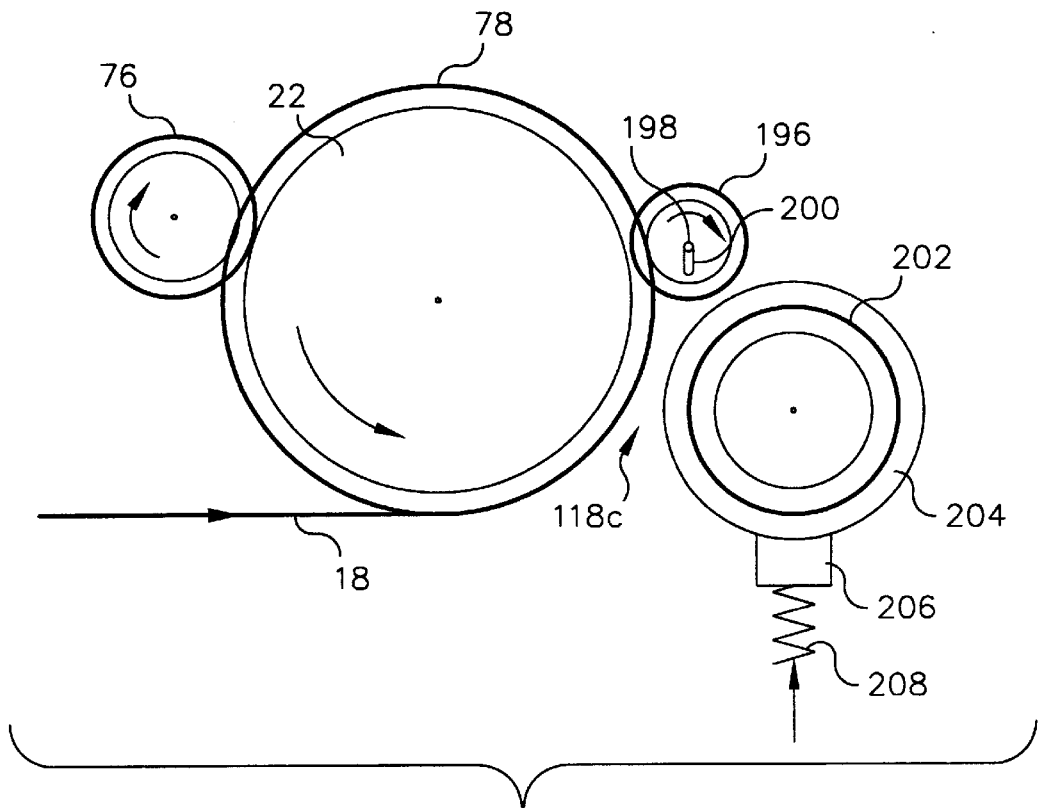
FIG. 11 shows a schematic plan view of the takeup spool, indicating details of a fourth embodiment of a brake mechanism according to the invention with the takeup spool rotating in the first, takeup direction.
Figure 12:
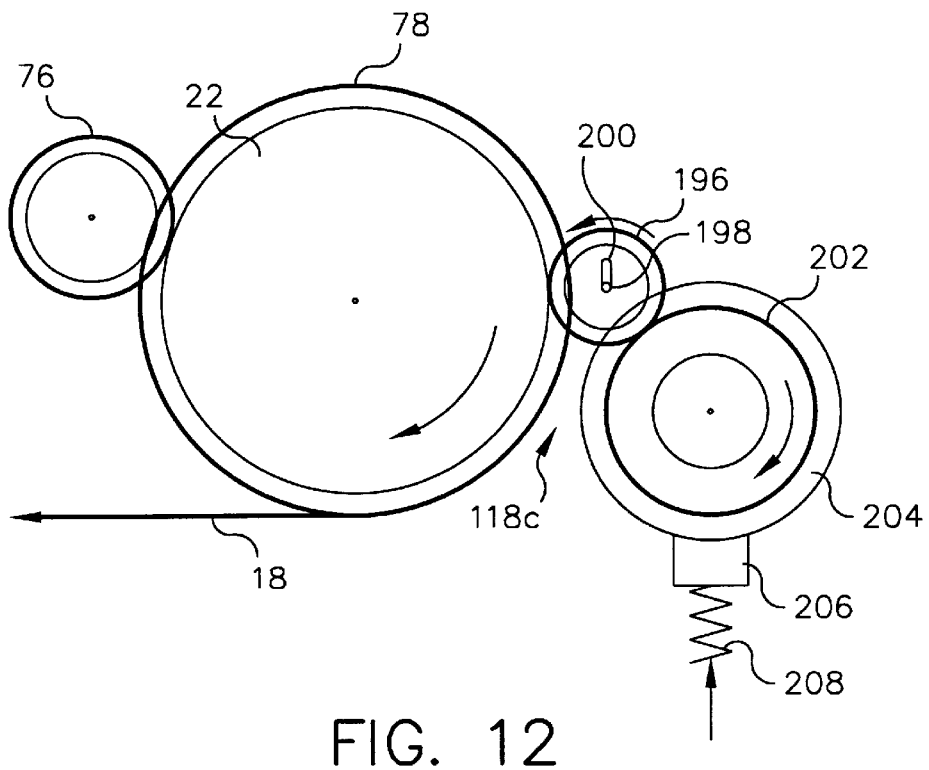
FIG. 12 shows the embodiment of FIG. 11 with the fourth embodiment of the brake mechanism actuated as the takeup spool rotates in the second, rewind direction.

FIGS. 11 and 12 show views of a fourth embodiment 118c of a mechanical brake mechanism according to the invention. In this instance, a swing gear 196 is supported by frame 100 in position to move into and out of engagement with gear 78, depending on the direction of movement of filmstrip 18. Gear 196 is mounted for rotation on an axle 198 which can slide in a slot 200, shown schematically, which those skilled in the camera arts will understand readily can be provided in frame 100. Thus, when filmstrip 18 is moving in the takeup direction of FIG. 11, gear 196 will be lifted upward in slot 200 by gear 78, as viewed in the figure, so that spool 22 can rotate freely. Adjacent gear 196, a braked gear 202 is rotatably supported by frame 100. Gear 196, axle 198 and slot 200 form a mechanism for disengaging gears 78 and 202 from a gear train when spool 22 rotates in the takeup direction, and for engaging gears 78 and 202 in a gear train when spool 22 rotates in the rewind direction. Other, idler gears may be added to the gear train, as will be understood by those skilled in the art.

A cylinder 204, only one end of which is shown, is mounted for rotation with gear 202. A friction shoe 206 is held in engagement with cylinder 204 by a spring 208. When filmstrip 18 is moving in the rewind direction of FIG. 12, swing gear 196 will be moved downward in slot 200 by gear 78, so that gears 196 and 202 engage and cylinder 204 rotates. Shoe 206 resists rotation of cylinder 204, so that a braking torque is applied via gear 196 to gear 78, to resist rotation of spool 22. This results in the desired application of tension to the filmstrip during rewind.

Figure 13:
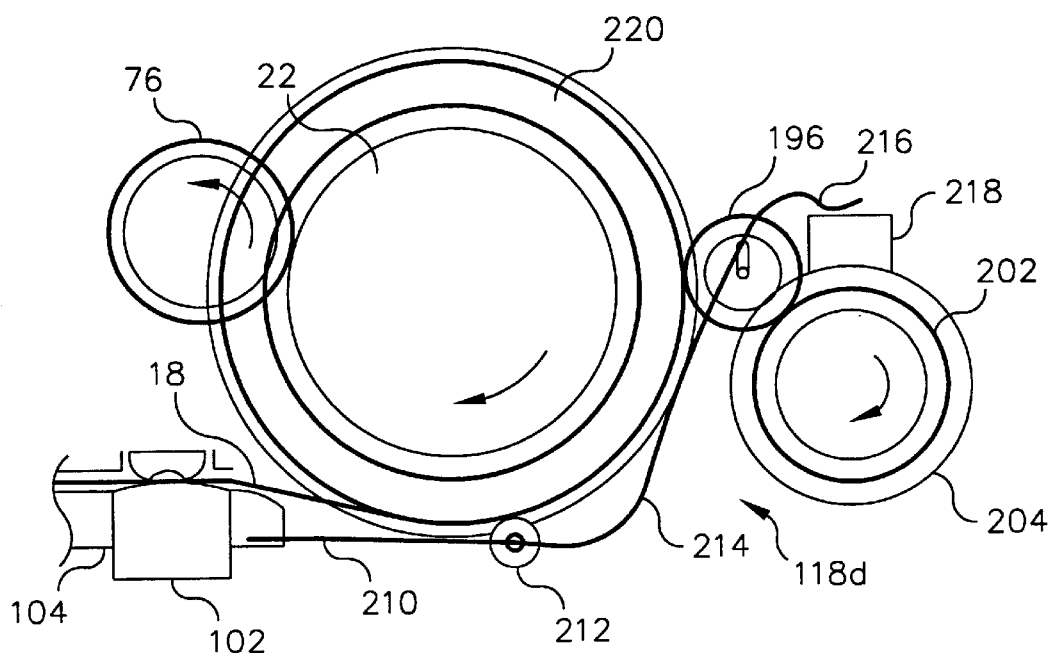
FIG. 13 shows a schematic plan view of the takeup spool, indicating details of a fifth embodiment of a brake mechanism according to the invention with the takeup spool rotating in the second, rewind direction at the beginning of rewind.
Figure 14:
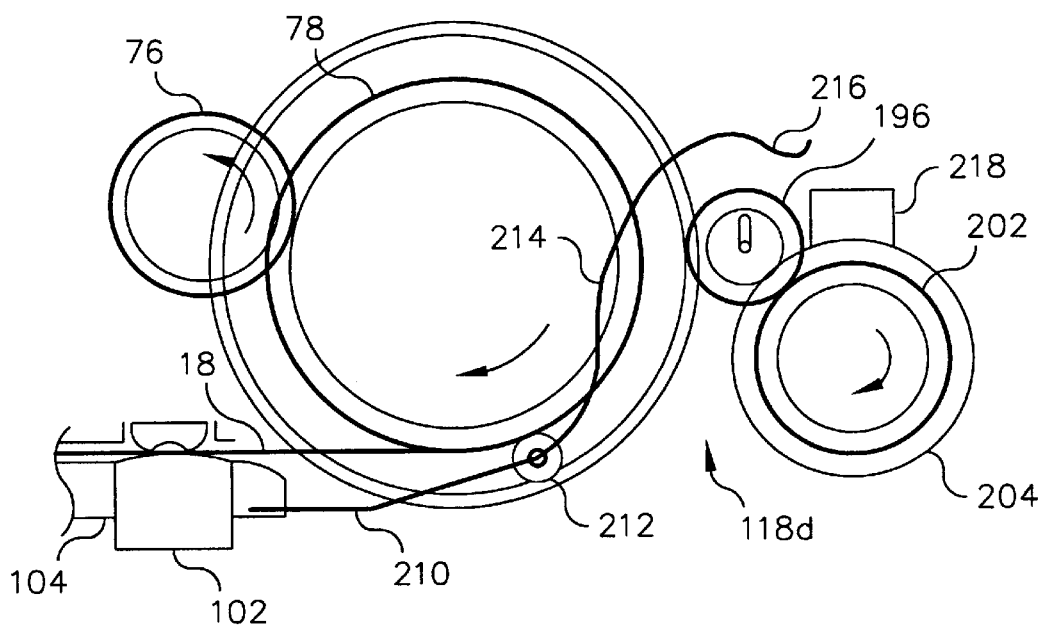
FIG. 14 shows the embodiment of FIG. 13 at the end of a rewind when the brake mechanism has been released.

FIGS. 13 and 14 show views of a fifth embodiment 118*d* of a mechanical brake mechanism according to the invention. During rewind of a filmstrip onto spool 92, the torque required from motor 24 for rewinding increases as the radius of the roll of filmstrip on spool 92 increases. Also, as the radius of the roll on spool 92 increases, jitter of the filmstrip tends to decrease. Thus, as rewinding progresses, it may be desirable to reduce the braking force applied to the takeup spool to reduce the load on motor 24. The embodiment of FIGS. 13 and 14 solves this problem with an advantageous combination of features of the embodiments of FIGS. 7 and FIGS. 11 and 12. In this instance an elongated, cantilevered leaf spring member 210 is fixed at one end to backing plate 104. A guide roller 212, which preferably has no brake or clutch mechanism of the type included in roller 160, is supported by spring member 210. Preferably, guide roller 212 has an axial length, not illustrated, chosen so that the guide roller can ride radially in and out between end flanges of spool 22, as a roll of the filmstrip is wound onto or unwound from the spool. Thus, spring member 210 is configured to press guide roller 212 against the roll of filmstrip as it is wound and unwound.

Beyond guide roller 212, spring member 210 bends to define an integral lateral extension 214 and an integral end portion 216. A friction brake shoe 218 is positioned to engage cylinder 204. When a full roll 220 of filmstrip 18 has been wound onto spool 22, as shown in FIG. 13, guide roller 212 will have moved radially outward on the surface of roll 220, thereby causing spring member 210 to flex radially outward to the illustrated position. As a result, end portion 216 resiliently presses brake shoe 218 against cylinder 204 to resist rotation of spool 22 in the rewind direction. This results in the desired application of tension to the filmstrip during an initial stage of rewind. But, as the radius of roll 220 decreases during rewind, spring member 210 causes guide roller 212 to follow the roll inwardly. As a result, end portion 216 eventually is moved out of contact with brake shoe 218, thereby releasing braking force against cylinder 204 and reducing the load on motor 24 for the rest of the rewind. Those skilled in the art will appreciate that the point at which end portion 216 is moved away from brake shoe 218 can be readily changed by adjusting the geometry and flexibility of lateral portion 214 and end portion 216, without departing from the scope of the invention.

| Parts List | | | |
|---|---|---|---|
| 10 | camera | 102 | magnetic read/record head |
| 12 | housing | 104 | backing plate |
| 14 | supply chamber | 106 | thrust disks on 92 |
| 16 | cartridge | 108 | loose convolutions of 18 on rewind |
| 18 | filmstrip | 114 | mount for 24 |
| 20 | takeup chamber | 116 | radial flange on 22 to support 78 |
| 22 | takeup spool | 117 | cylindrical surface on 114 |
| 24 | motor to rotate 22 | 118, 118a, 118b, 118c, 118d | brake |
| 26 | power source/batteries | | mechanisms for 22 |
| 28 | controller | 120 | internal circumferential relief |
| 30 | taking lens | 122 | helical clutch spring |
| 32 | combined shutter/aperture | 124 | first, free end of 122 |
| 34 | image plane | 126 | second, captured end of 122 |
| 36 | auto-ranging device | 128 | radial slot in 22 for 126 |
| 38 | photo sensor | 136 | flange on 114 |
| 40 | film data reader | 138 | shaft |
| 42 | viewfinder | 140 | gear engaged with 78 |
| 50 | output shaft of 24 | 142 | helical clutch spring |
| 52 | pinion | 144 | first, free end of 142 |
| 54 | sun gear | 146 | second, captured end of 142 |
| 56–66 | reduction gear train | 148 | retainer slot for 146 |
| 68 | planetary gear | 150 | flange on 100 |
| 70 | lever arm supporting 68 | 160 | guide roller |
| 72–78 | takeup gear train | 162 | leaf spring to support 160 |
| 80–88 | rewind gear train | 164 | clutch mechanism |
| 90 | rotatable fork member in 14 | 166 | cylindrical roller body/shell |
| 92 | supply spool in 16 | 168 | roller axle |
| 100 | internal frame of 10 | 170 | clutch disk on 168 |
| 172 | pressure plate | 200 | slot in 100 for guiding 198 |
| 174, 176 | radially & circumferentially extended ratchet fingers of 172 | 202 | gear |
| | | 204 | cylinder rotated with 202 |
| 178 | spring disk | 206 | friction brake shoe |
| 180 | screw to compress 178 | 208 | spring |
| 182, 184 | notches in 166 to engage 174, 176 in second, rewind direction | 210 | leaf spring |
| | | 212 | guide roller |

-continued

Parts List

| | | | |
|---|---|---|---|
| 186 | compliant, high friction cover on | 214 | lateral extension of 210 |
| 166 | to engage 18 on 22 | 216 | end portion of 210 |
| 196 | swing gear | 218 | friction brake shoe |
| 198 | axle of 196 | 220 | roll of filmstrip on 22 |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A photographic camera including a supply chamber for receiving a cartridge enclosing a photographic filmstrip wound on a supply spool; a rotatable member disposed in the supply chamber for being coupled to rotate a supply spool of a cartridge installed in the supply chamber; a takeup chamber; a takeup spool in the takeup chamber for winding a filmstrip drawn in a first direction from a cartridge in the supply chamber; a head positioned between the supply and takeup chambers for at least one of reading and recording data on a filmstrip; a first drive system for rotating the takeup spool to draw a filmstrip from a cartridge in the first direction and wind a filmstrip onto the takeup spool; and a second drive system for rotating the rotatable member to rotate a supply spool to draw a filmstrip in a second, opposite direction from the takeup spool and wind a filmstrip onto a supply spool in a cartridge, is characterized by:

a brake mechanism, self-actuated in response to a change in rotation of the takeup spool from the first direction to the second direction, to resist rotation of the takeup spool in the second direction, so as to apply tension to, and reduce variations in speed of, a filmstrip while the head records data as a filmstrip is wound from the takeup spool to a supply spool in a cartridge.

2. A camera according to claim 1, wherein the brake mechanism comprises:

a fixed member;

a helical clutch spring mounted about the fixed member, the clutch spring having a first, free end and a second end connected for rotation about the fixed member in response to rotation of the takeup spool; and the clutch spring being mounted so that rotation of the takeup spool in the first direction is effective to loosen the clutch spring about the fixed member, while rotation of the takeup spool in the second direction is effective to tighten the clutch spring about the fixed member, whereby rotation of the takeup spool is resisted in the second direction.

3. A camera according to claim 2, wherein the fixed member is mounted coaxially with the takeup spool and the second end of the helical spring is connected to the takeup spool.

4. A camera according to claim 3, wherein the second drive system comprises a motor and a gear train; and the fixed member is the motor.

5. A camera according to claim 1, wherein the brake mechanism comprises:

a guide roller for engaging a filmstrip wound on the takeup spool;

a spring member supporting the guide roller for rotation, the spring member being supported in the camera for resiliently engaging the guide roller with a roll of filmstrip wound on the takeup spool; and a clutch mechanism engaged with the guide roller for permitting free rotation of the guide roller when a filmstrip moves in the first direction and for resisting rotation of the guide roller when a filmstrip moves in the second direction.

6. A camera according to claim 5, wherein the guide roller comprises a cylindrical roller body; a roller axle supported within the roller body by the spring member; a clutch disk supported by the axle; a pressure plate engaged with the clutch disk; at least one ratchet finger extended radially and circumferentially from the pressure plate for sliding engagement with the roller body when a filmstrip moves in the first direction and for fixed engagement with the roller body when a filmstrip moves in the second direction; and a spring for pressing the pressure plate into engagement with the clutch disk, whereby during movement of a filmstrip in the second direction, rotation of the guide roller causes the pressure plate to slip on the clutch disk to provide resistance to rotation of the takeup spool.

7. A camera according to claim 5, wherein the roller body comprises at least one notch engaged by the ratchet finger when a filmstrip moves in the second direction.

8. A camera according to claim 5, further comprising a high friction outer surface on the roller body for engaging a filmstrip.

9. A camera according to claim 5, further comprising a compliant, high friction coating on the roller body for engaging a filmstrip.

10. A camera according to claim 1, wherein the brake mechanism comprises:

a first gear rotated by the takeup spool when a filmstrip moves in the second direction;

a second gear supported for rotation within the camera;

a mechanism for resisting rotation of the second gear; and a mechanism for disengaging the first and second gears from a gear train when the takeup spool rotates in the first direction and for engaging the first and second gears in a gear train when the spool rotates in the second direction.

11. A camera according to claim 10, wherein the mechanism for disengaging and engaging comprises:

a swing gear mounted for movement by the first gear between a first position out of engagement with the second gear when the takeup spool rotates in the first direction, and a second position in engagement with both the first and second gears, when the takeup spool rotates in the second direction, whereby in the second position rotation of the first gear rotates the swing gear and the second gear.

12. A camera according to claim 10, wherein the mechanism for resisting comprises a cylinder mounted for rotation with the second gear and a friction shoe resiliently engaged with the cylinder to resist rotation of the cylinder and the second gear.

13. A camera according to claim 1, wherein the read/write head is magnetic.

14. A camera according to claim 1, wherein the brake mechanism comprises:

a shaft driven by rotation of the takeup spool;

a helical spring clutch mounted about the shaft, the clutch spring having a first, free end and a second end connected to a frame of the camera; and the clutch spring being mounted so that rotation of the takeup spool in the first direction is effective to loosen the clutch spring about the shaft, while rotation of the takeup spool in the second direction is effective to tighten the clutch spring about the shaft, whereby rotation of the takeup spool is resisted in the second direction.

15. A camera according to claim 14, further comprising a first gear carried by the takeup spool and a second gear carried by the shaft, the first gear being engaged with the second gear.

16. A camera according to claim 1, wherein the brake mechanism comprises:

a first gear rotated by the takeup spool when a filmstrip moves in the second direction;

a second gear supported for rotation within the camera;

a mechanism for resisting rotation of the second gear;

a mechanism for disengaging the first and second gears from a gear train when the takeup spool rotates in the first direction and for engaging the first and second gears in a gear train when the spool rotates in the second direction;

a guide roller for engaging a roll of filmstrip wound on the takeup spool;

a spring member supporting the guide roller for rotation, the spring member being supported in the camera for resiliently engaging the guide roller with a roll of filmstrip wound on the takeup spool; and an extension of the spring member having a portion which engages and actuates the mechanism for resisting rotation when the takeup spool rotates in the second direction.

17. A camera according to claim 16, wherein the mechanism for disengaging and engaging comprises:

a swing gear mounted for movement by the first gear between a first position out of engagement with the second gear when the takeup spool rotates in the first direction and a second position in engagement with both the first and second gears when the takeup spool rotates in the second direction, whereby in the second position rotation of the first gear rotates the swing gear and the second gear.

18. A camera according to claim 16, wherein the mechanism for resisting comprises a cylinder mounted for rotation with the second gear and a friction shoe engaged with the portion of the spring member and with the cylinder to resist rotation of the cylinder and the second gear.

19. A camera according to claim 16, wherein a radius of a roll of filmstrip decreases as the takeup spool rotates in the second direction, such that movement of the guide roller while in engagement with the roll causes the portion of the spring member to move out of engagement with the mechanism for resisting rotation.

20. A brake mechanism for a spool on which a strip of web material may be wound, the brake mechanism comprising:

a frame rotatably supporting the spool;

a first gear rotated by the spool;

a second gear rotatably supported by the frame;

a mechanism supported by the frame for resisting rotation of the second gear;

a mechanism for disengaging the first and second gears from a gear train when the spool rotates in a first direction and for engaging the first and second gears in a gear train when the spool rotates in a second direction;

a guide roller for engaging a roll of web material wound on the spool;

a spring member supporting the guide roller for rotation, the spring member being supported for resiliently engaging the guide roller with a roll of web material wound on the spool; and an extension of the spring member having a portion which engages and actuates the mechanism for resisting rotation when the spool rotates in the second direction.

21. A brake mechanism according to claim 20, wherein the mechanism for disengaging and engaging comprises:

a swing gear mounted for movement between a first position out of engagement with the second gear when the spool rotates in a first direction, and a second position in engagement with the first and second gears when the spool rotates in a second direction, whereby in the second position rotation of the first gear rotates the swing gear and the second gear.

22. A brake mechanism according to claim 20, wherein the mechanism for resisting comprises a cylinder mounted for rotation with the second gear and a friction shoe engaged with the portion of the spring member and with the cylinder to resist rotation of the cylinder and the second gear.

23. A camera according to claim 20, wherein a radius of a roll of web material decreases as the spool rotates in the second direction, such that movement of the guide roller while in engagement with the roll causes the portion of the spring member to move out of engagement with the mechanism for resisting rotation.

* * * * *